United States Patent
Kämpfe et al.

(10) Patent No.: US 12,392,934 B2
(45) Date of Patent: Aug. 19, 2025

(54) OPTICAL DEVICE WITH SURFACE TEXTURING EXTENDING THROUGH COATING LAYER INTO SUBSTRATE

(71) Applicants: Hydromecanique et Frottement, Andrezieux-Boutheon (FR); Manutech-USD, Saint-Etienne (FR); Université Jean Monnet Saint-Etienne, Saint-Etienne (FR); Centre National de la Recherche Scientifique, Paris (FR)

(72) Inventors: Thomas Kämpfe, Corbas (FR); Laurent Dubost, Chamboeuf (FR); Xxx Sedao, Saint-Etienne (FR)

(73) Assignees: Hydromecanique et Frottement, Andrezieux-Boutheon (FR); Manutech-USD, Saint-Etienne (FR); Université Jean Monnet Saint-Etienne, Saint-Etienne (FR); Centre National de la Recherche Scientifique, Paris (FR)

( * ) Notice: Subject to any disclaimer, the term of this patent is extended or adjusted under 35 U.S.C. 154(b) by 747 days.

(21) Appl. No.: 17/771,505

(22) PCT Filed: Oct. 26, 2020

(86) PCT No.: PCT/FR2020/051933
§ 371 (c)(1),
(2) Date: Apr. 25, 2022

(87) PCT Pub. No.: WO2021/079077
PCT Pub. Date: Apr. 29, 2021

(65) Prior Publication Data
US 2022/0365249 A1    Nov. 17, 2022

(30) Foreign Application Priority Data

Oct. 24, 2019 (FR) ......................... 1911937

(51) Int. Cl.
*G02B 1/118* (2015.01)
*G02B 1/12* (2006.01)
(Continued)

(52) U.S. Cl.
CPC ................ *G02B 1/118* (2013.01); *G02B 1/12* (2013.01); *G02B 5/0808* (2013.01); *G02B 5/208* (2013.01)

(58) Field of Classification Search
CPC ........ G02B 1/118; G02B 1/12; G02B 5/0808; G02B 5/208; G02B 1/00; G02B 1/10;
(Continued)

(56) References Cited

U.S. PATENT DOCUMENTS

| | | | |
|---|---|---|---|
| 2008/0074748 A1 | 3/2008 | Kittaka et al. | |
| 2008/0106789 A1* | 5/2008 | Hirai | G02B 5/3083 359/489.08 |
| 2015/0103396 A1 | 4/2015 | Zollars et al. | |

FOREIGN PATENT DOCUMENTS

| | | |
|---|---|---|
| CN | 101726769 | 6/2010 |
| CN | 104160311 | 11/2014 |

(Continued)

OTHER PUBLICATIONS

Allowed claims for U.S. Appl. No. 17/771,504, dated Dec. 9, 2024.*
(Continued)

*Primary Examiner* — Arnel C Lavarias

(57) ABSTRACT

An optical device for transmitting/reflecting electromagnetic radiation in a wavelength range of an electromagnetic spectrum. The optical device includes a substrate made of a first material, a coating layer made of a second material that is different from the first material, and a a plurality of cavities formed in surface of the device. The plurality of cavities extend through the coating layer and are partially sunk into the substrate.

15 Claims, 14 Drawing Sheets

(51) Int. Cl.
*G02B 5/08* (2006.01)
*G02B 5/20* (2006.01)

(58) Field of Classification Search
CPC .......... G02B 1/11; G02B 1/111; G02B 1/113; G02B 1/115; G02B 5/00; G02B 5/18; G02B 2005/1804; G02B 5/1809; G02B 5/1866; G02B 5/20; G02B 5/28; G02B 5/281; G02B 5/283; G02B 5/285; G02B 5/286; G02B 5/287
USPC ....... 359/601, 602, 603, 609, 577, 580, 581, 359/586, 588, 589, 590, 558, 566, 569, 359/574, 575, 576
See application file for complete search history.

(56) References Cited

FOREIGN PATENT DOCUMENTS

| | | |
|---|---|---|
| EP | 1785748 | 5/2007 |
| EP | 3206059 | 8/2017 |
| EP | 3355085 | 8/2018 |
| JP | 2007-069604 | 3/2007 |
| JP | 2008-058438 | 3/2008 |
| JP | 2008-164996 | 7/2008 |
| JP | 2011-248213 | 12/2011 |
| JP | 2019-035802 | 3/2019 |
| WO | WO 2010/056500 | 5/2010 |
| WO | WO 2011/021752 | 2/2011 |

OTHER PUBLICATIONS

International Search Report and the Written Opinion Dated Feb. 4, 2021 From the International Searching Authority Re. Application No. PCT/FR2020/051933 and Its Translation of Search Report Into English. (14 Pages).

Chattopadhyay et al. "Anti-Reflecting and Photonic Nanostructures", Materials Science and Engineering: R: Reports, 69(1-3): 1-35, Jun. 20, 2010.

* cited by examiner

Fig. 16
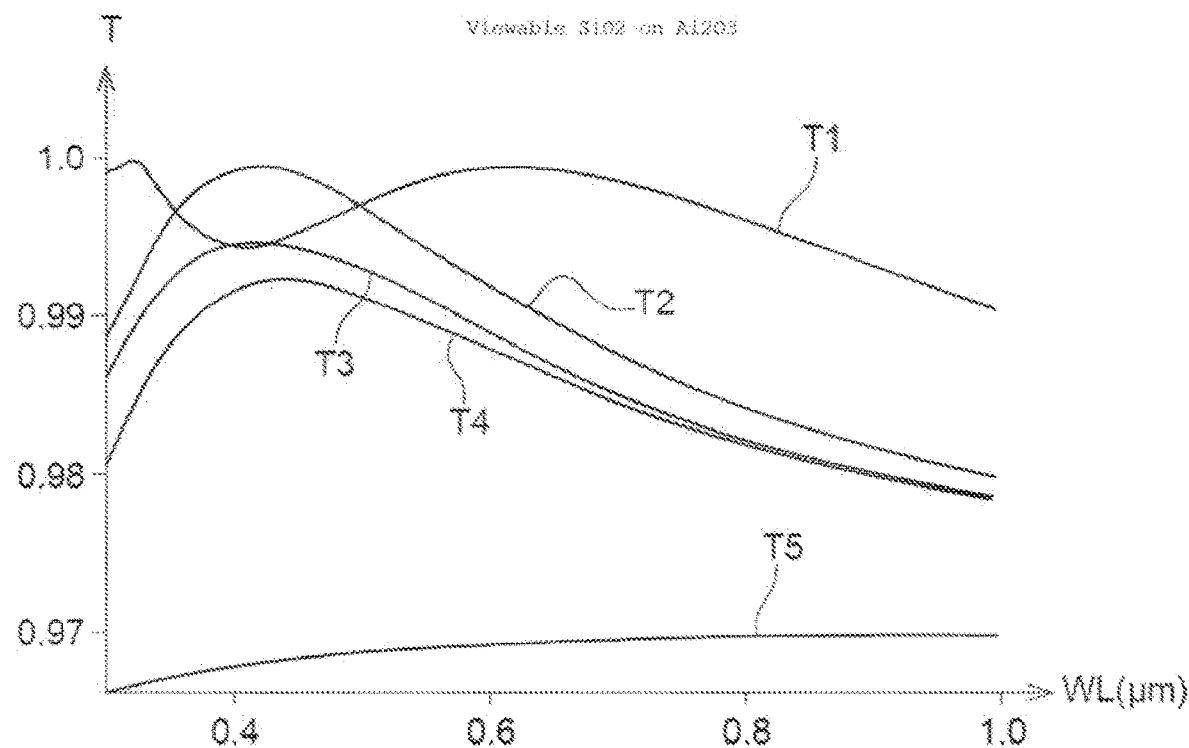
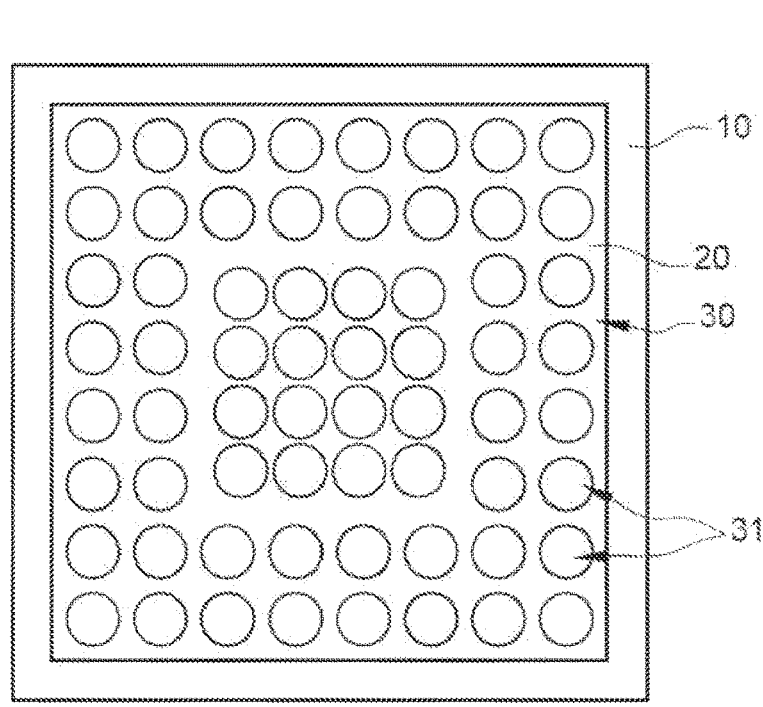
Fig. 17

OPTICAL DEVICE WITH SURFACE TEXTURING EXTENDING THROUGH COATING LAYER INTO SUBSTRATE

RELATED APPLICATIONS

This application is a National Phase of PCT Patent Application No. PCT/FR2020/051933 having International filing date of Oct. 26, 2020, which claims the benefit of priority of French Patent Application No. FR1911937 filed on Oct. 24, 2019. The contents of the above applications are all incorporated by reference as if fully set forth herein in their entirety.

FIELD AND BACKGROUND OF THE INVENTION

The present invention relates to an optical device, suitable for transmitting or reflecting radiation in a predetermined wavelength range, for example of the ultraviolet, visible, infrared or microwave type.

The field of the invention is that of the optical devices, designed for example to equip imaging systems. In practice, the applications depend on the wavelength range.

In a known manner, the anti-reflective or mirror effects can be obtained by multilayer construction and/or by structuring optical devices.

The following documents describe different examples of optical devices.

EP3206059A1 describes a broadband diffractive device, comprising a plurality of elementary zones and microstructures arranged to form an artificial material having an effective index variation at the surface of the device.

BRUYNOOGHE (2016), "Broadband and wide-angle hybrid antireflection coatings prepared by combining interference multilayers with subwavelength structures", Journal of Nanophotonics, SPIE, International Society for Optics and Photonics. This document describes a multilayer construction combined with stochastic structures made by dry etching.

KUBOTA (2014), "Optimization of hybrid antireflection structure integrating surface texturing and multi-layer interference coating", Thin Films for Solar and Energy Technology VI, Graduate School of Science and Engineering, Yamagata University, Japan. This document describes the theoretical study of the combination of a multilayer construction and a moth-eye type array.

CAMARGO (2012), "Multi-scale structured, superhydrophobic and wide-angle, antireflective coating in the near-infrared region", Chem. Commun., 2012, 48, 4992-4994, Royal Society of Chemistry, United Kingdom. This document describes the structuring of several layers, with a focus on the improvement of certain surface behaviours.

RALCHENKO (1999), "Fabrication of CVD Diamond Optics with Antireflective Surface Structures", phys. stat. sol., General Physics Institute, Moscow, Russia. This document describes the structuring of diamond deposited by CVD to achieve an anti-reflective effect.

SUMMARY OF THE INVENTION

The aim of the present invention is to propose an optical device, of the anti-reflective or mirror type, having improved properties.

To this end, the invention aims for an optical device, suitable for transmitting/reflecting electromagnetic radiation in a wavelength range of the electromagnetic spectrum, said device comprising at least:
 a substrate made of a first material,
 a coating layer made of a second material that is different from the first material, and
 surface texturing forming cavities in the device,
characterized in that the cavities extend through the coating layer and are partially sunk into the substrate.

Thus, the invention makes it possible to modify, in a controlled manner, the front of an electromagnetic wave.

Texturing makes it possible to make the effective refraction index vary over the surface of the textured device. In particular, texturing makes it possible to obtain lower effective refraction indices in a controlled manner, in the textured coating layer and in the textured zone of the substrate. Texturing makes it possible to obtain unattainable effective indices directly by using multilayers. The indices are variable according to the wavelength of the radiation.

Also, the invention makes it possible to increase the angle of incidence range for which the validity of the optical function is interesting.

The structure of the device forms at least one two-layer system, comprising the textured coating layer and the textured layer of the substrate, surmounting the untextured part of the substrate.

According to a first application, the optical device has an anti-reflective function. The device is suitable for transmitting electromagnetic radiation in a wavelength range of the electromagnetic spectrum. The device comprises at least one substrate made of a first transparent material in said wavelength range, a coating layer made of a second material that is different from the first material and also transparent in said wavelength range, and surface texturing forming cavities in the device. The device is characterised in that the cavities extend through the coating layer and are partially sunk into the substrate.

Advantageously, the invention makes it possible to improve the transmission of the device, at the level of the spectral width and of the maximum transmission (therefore minimum absorption), with respect to an untextured and uncoated substrate; a textured and uncoated substrate; a coated substrate of an untextured coating layer; and even a substrate coated with a textured coating layer, but the texturing of which does not penetrate the substrate. This improvement depends on the configuration of the device, in particular the characteristics of the substrate/coating couple and the texturing.

In comparison with a textured and uncoated substrate, the textured coating layer makes it possible to improve the transmission by forming shallower cavities. Thus, texturing is easier and quicker to do.

In comparison with a coated substrate of an untextured coating layer, the surface behaviour of the device is modified.

In practice, the device does not make it possible to improve the transmission over the whole electromagnetic spectrum, but is configured for a transmission over a wavelength range, dependent on the characteristics of the substrate/coating couple and of the texturing.

The wavelengths range are defined according to the subdivisions recommended by the International Commission on Illumination (CIE):
 Gamma ray: less than 10 pm
 X-ray: 10 pm to 10 nm
 Ultraviolet: 10 nm to 380 nm Visible: 380 nm to 780 nm
IR-A (near IR): 0.78 µm to 1.4 µm
IR-B (mid IR): 1.4 µm to 3 µm
IR-C (far IR): 3 µm to 1 mm
Radioelectric waves: greater than 1 mm For the IR range, the following subdivisions can also be used:
NIR (near IR): 0.75 µm to 1.4 µm
SWIR: 1.4 µm to 3 µm
MWIR: 3 µm to 8 µm
LWIR: 8 µm to 15 µm
FIR (far IR): 15 µm to 1 mm As regards transmission, the different variants of the device are not necessarily more efficient than the devices of the state of the art. However, the device according to the invention has other advantages: easy to manufacture, surface voltage, etc.

According to a second application, the optical device has a mirror function. The device is suitable for reflecting electromagnetic radiation in a wavelength range of the electromagnetic spectrum. The device comprises at least one substrate made of a first material reflecting in said wavelength range, a coating layer made of a second material that is different from the first material and also reflecting in said wavelength range, and surface texturing forming cavities in the device. The device is characterised in that the cavities extend through the coating layer and are partially sunk into the substrate.

Thus, the invention makes it possible to improve the reflection of the device, with respect to an untextured and uncoated substrate, a textured and uncoated substrate, or a substrate coated with an untextured coating layer.

According to a variant, the optical device has a mirror function, and comprises at least one substrate made of a first transparent material in said wavelength range, a coating layer made of a second material that is different from the first material and also transparent in said wavelength range, and surface texturing forming cavities in the device. The device is characterised in that the cavities extend through the coating layer and are partially sunk into the substrate.

Alternatively (or in combination with the reflectance and transmittance functions), the optical device can have a function of modifying the wavefront of optical surfaces, different from the anti-reflective and mirror functions.

According to a first embodiment, the device comprises one single substrate layer supporting one or more coating layers.

The substrate preferably has a thickness of between 0.1 and 30 mm, for example around 1 or 2 mm.

The coating layer preferably has a thickness of between 0.01 and 50 µm, for example around 0.5 µm or 2 µm for the IR range.

The material of the substrate is, for example, silicon Si, germanium Ge, zinc sulphide ZnS, zinc selenide ZnSe, etc, for the IR applications.

The substrate generally has a crystalline structure.

The coating can have an amorphous or crystalline structure.

The material of the coating layer is, for example, amorphous carbon DLC ("Diamond Like Carbon"), silicon Si, germanium Ge, zinc sulphide ZnS, zinc selenide ZnSe, tantalum pentoxide Ta2O5, hafnium dioxide HfO2, alumina Al2O3, etc.

The device preferably comprises at least one rear layer.

The device can comprise one single substrate and one single coating layer. In this case, preferably, the substrate has a refraction index greater than the refraction index of the coating before texturing.

The device can comprise one single substrate and several textured coating layers. In this case, preferably, the substrate has a refraction index greater than the refraction index of the coatings before texturing. Alternatively, the substrate can have a refraction index less than at least one of the coating layers.

According to a second embodiment, the structure of the device forms a stack of layers comprising more than one coating layer and one layer of the substrate. In this case, each substrate is defined as a support layer of a coating layer.

The substrates and the coating layers preferably have a thickness of between 0.01 and 50 µm, for example around 0.5 µm or 2 µm for the IR range.

The material of the substrates and of the coating layers is, for example, amorphous carbon DLC ("Diamond Like Carbon"), silicon Si, germanium Ge, zinc sulphide ZnS, zinc selenide ZnSe, tantalum pentoxide Ta2O5, hafnium dioxide HfO2, alumina Al2O3, etc.

The substrate can have an amorphous or crystalline structure.

The coating can have an amorphous or crystalline structure.

The device preferably comprises at least one rear layer.

The rear layer disposed against the last substrate preferably has a thickness of between 0.1 and 30 mm, for example around 1 or 2 mm.

The rear layer disposed against the last substrate can have a crystalline structure.

If the device comprises several rear layers, the second rear layer preferably has a thickness of between 0.01 and 50 µm, for example around 0.5 µm or 2 µm for the IR range.

The material of the rear layer can be, for example, amorphous carbon DLC ("Diamond Like Carbon"), silicon Si, germanium Ge, zinc sulphide ZnS, zinc selenide ZnSe, tantalum pentoxide Ta2O5, hafnium dioxide HfO2, alumina Al2O3, etc, or also silicon Si, germanium Ge, zinc sulphide ZnS, zinc selenide ZnSe, etc, for the IR applications.

If there is no rear layer, the last substrate preferably has a thickness of between 0.1 and 30 mm, for example around 1 or 2 mm, and its material is, for example, silicon Si, germanium Ge, zinc sulphide ZnS, zinc selenide ZnSe, etc, for the IR applications.

The device can comprise a stack of several substrates and coating layers alternately, including at least one first combination of a first coating layer and a first substrate, oriented on the upper side, receiving the incident radiation, and a last combination of a last coating layer and a last substrate.

The cavities can be formed only in the first combination, oriented on the upper side, receiving the incident radiation.

The cavities can extend fully through the stack, except for the last substrate, which is partially sunk into.

Preferably, the cavities have an area cross-section strictly decreasing in the direction of the last substrate.

The cavities can extend fully through the coating layer and partially sink into the substrate for each combination forming the stack.

The stack can comprise at least one intermediate combination between the first combination and the last combination.

The device can comprise a rear layer for each substrate/coating combination. In this case, the rear layer can possibly be extended through by the cavities, penetrating into the next coating layer. Alternatively, the device can comprise one single rear layer for the last combination. In this case, the rear layer is not extended through by the cavities.

According to other advantageous characteristics of the invention, taken individually or in combination:

The cavities are formed in the substrate over a depth, preferably of between 0.5 and 10 µm, for example around 1 µm, for the far IR range, beyond 3 µm.

The cavities are formed in the substrate over a depth, preferably of between 0.08 µm and 3 µm, for example around 200 nm, for the near IR or mid IR range between 780 nm and 3 µm.

The cavities are formed in the substrate over a depth, preferably of between 1 nm to 600 nm, for example around 80 nm, for the visible range.

Preferably, for the IR applications, the substrate and the coating layer are transparent/reflective for the whole wavelength range of between 1 µm and 50 µm.

Preferably, for the far IR range of between 8 µm and 12 µm, the device enables a transmittance/reflectance of at least 90% of the incident infrared radiation for the dioptre in question.

The characteristics of the cavities (shape, dimensions, distribution, etc) depend on the texturing technique and the parameters used.

Preferably, the cavities have a greater width or a diameter of between 0.02 and 3 µm, in particular between 1 and 2 µm.

The coating layer can be made by a thin-layer depositing technique, such as PVD or CVD.

Texturing can be done by any type of suitable technique for extending through the coating layer and partially sinking into the substrate, for example laser ablation, photolithography, nano-printing, etc. Laser texturing is relatively economical and well-controlled.

Texturing can be done by an ultra-short laser, with a pulse duration in the femtosecond or picosecond regime. The wavelength of the laser, which typically varies between 200 and 16000 nm, is to be chosen according to the desired texturing characteristics (shape and dimensions of the cavities, patterns, etc.).

The optomechanical environment of the laser comprises motorised stages, a microscope lens (and/or Galvano scanner, and/or microsphere single-layer), an online viewing unit, etc.

Preferably, the cavities have a continuous profile during the transition between the coating layer and the substrate. This continuous profile can be obtained by forming cavities in the coating layer and in the substrate during one same texturing operation, for example, a laser texturing. A continuous profile improves the controlling of the shape sought of the wavefront. Indeed, discontinuities can generate the diffraction or other undesired effects.

The cavities can have a circular cross-section.

The cavities have an area cross-section, strictly decreasing in the direction of the last substrate.

The cavities can have a concave profile in an axial plane, with an area cross-section, decreasing according to the depth.

The cavities can have a symmetrical concave profile in an axial plane.

The cavities can have an asymmetrical concave profile in an axial plane.

The cavities can have different dimensions, in particular different diameters, widths and/or depths.

The dimensions of the cavities can vary periodically.

The dimensions of the cavities can have a variable periodicity, evolving according to a defined rule and not randomly.

The cavities can be distributed randomly over the surface of the device.

The cavities can be distributed according to a regular array over the surface of the device.

The cavities can be distributed according to an array having a triangular, square, hexagonal mesh, etc.

The cavities can be distributed with a variable periodicity over the surface of the device.

The variable periodicity evolves according to a defined rule and not randomly.

The variable periodicity evolves regularly.

The cavities can have a different periodicity between the centre and the edges of the device.

The cavities can be closer at the centre of the device.

In the coating layer, the cavities have a density of between 20 and 91%, i.e. a rate of filling the space of between 20 and 91%. The rate of 91% corresponds to the cavities arranged hexagonally and which touch one another.

The device can comprise at least one rear layer made of a material that is different from the substrate and from the coating, the coating being formed on a first side of the substrate, the rear layer being formed on a second side of the substrate opposite the first side.

The rear layer is, for example, made of zinc sulphide ZnS, or other materials mentioned above for the substrate or the coating layer.

The device can comprise two faces, each with a coating layer and surface texturing forming cavities extending through the coating layer and partially penetrating the substrate or one of the substrates.

The device can comprise a first face with a coating layer and surface texturing forming cavities extending through the coating layer and partially penetrating the substrate or one of the substrates, and a second face with a coating layer which can have no texturing according to the invention, or receive a treatment different from the texturing of the first face, or receive no treatment.

The coating layers of the two faces can be different (material, thickness, etc.).

The faces of the device can be parallel or not. For example, the faces can be disposed in inclined planes. According to another example, the faces can be concave or convex.

The invention also aims for a method for manufacturing an optical device, suitable for transmitting/reflecting electromagnetic radiation in a wavelength range of the electromagnetic spectrum, said method comprising at least the following steps:

forming at least one combination of a substrate made of a first material, and a coating layer made of a second material that is different from the first material, then performing surface texturing forming cavities in the device, characterised in that the cavities extend through the coating layer and are partially sunk into the substrate.

The invention can have numerous applications in the field of optical devices:

IR applications: camera, lens, optical window, camouflage surface, lure, etc.

Visible and near IR applications: optical windows, lenses, mirrors for imaging device cameras, laser lines, laser shaping, etc.

Radioelectric wave applications: radar, etc.

BRIEF DESCRIPTION OF THE SEVERAL VIEWS OF THE DRAWINGS

The invention will be best understood upon reading the description below, given only as a non-limiting example and made in reference to the appended drawings, in which:

FIG. 16 is a graph similar to FIG. 7, showing the evolution of the transmission (T of 0.966 to 1) according to the wavelength (WL of 0.3 to 1 μm), for five different devices, configured like in FIGS. 1 to 5, with an alumina Al2O3 substrate and for some, a silicon dioxide SiO2 coating layer.

FIG. 17 is a schematic, top view representation of a variant of the device according to the invention, the cavities of which have a variable periodicity over the surface of the device, by being closer at the centre than at the edges of the device.

DESCRIPTION OF SPECIFIC EMBODIMENTS OF THE INVENTION

Figure 1:
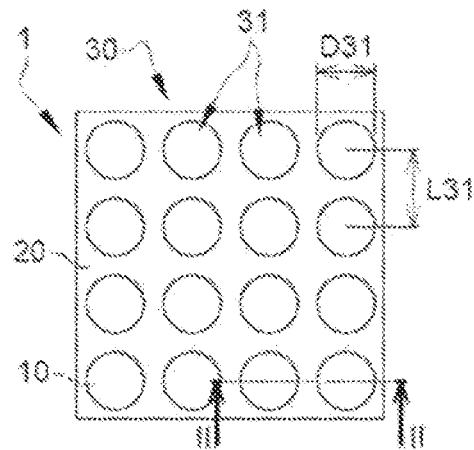
FIG. 1 is a schematic, cross-sectional representation of a device according to the invention, comprising a silicon Si substrate, an amorphous carbon DLC coating layer, and texturing forming cavities in the device, the cavities extending through the coating layer and partially sinking into the substrate.
Figure 2:
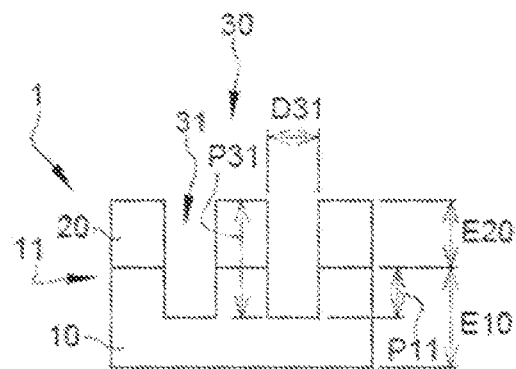
FIG. 2 is a cross-section similar to FIG. 1, showing a device constituted by an untextured SI substrate and an untextured DLC coating.

In FIGS. 1 and 2, an anti-reflective optical device (1) according to the invention is represented.

The device (1) is well-suited to transmitting electromagnetic radiation in a far IR wavelength range of between 7 and 15 µm (LWIR).

The device (1) comprises a silicon Si substrate (10), with for example a thickness (E10) of 1 or 2 mm. The substrate (10) has a refraction index n=3.43 and is transparent in the abovementioned wavelength range.

The device (1) comprises an amorphous carbon coating layer (20), also called DLC, with a thickness (E20) of 1425 nm. The DLC has a refraction index n=1.8 and is transparent in the abovementioned wavelength range.

The device (1) comprises surface texturing (30) forming separate cavities (31), which extend through the coating layer (20) and are partially sunk into the substrate (10). The cavities (31) are distributed along a regular array over the surface of the device (1). The cavities (31) have a periodicity (L31) of 2 µm, a diameter (D31) of 1.6 µm, and a depth (P31) of around 2.34 µm. The cavities (31) penetrate into the substrate (10), in a textured layer (11) having a depth (P11) of 915 nm, a lot less than the thickness (E10) of the substrate (10). The texturing (30) makes it possible to lower the effective refraction index in the textured layer (11) of the substrate (10), in a controlled manner.

The texturing (30) can be done by any type of technique which is suitable for extending through the coating layer (20) and partially sinking into the substrate (10), for example laser ablation, photolithography, nano-printing, etc. Laser texturing is relatively inexpensive and well-controlled. In particular, the texturing (30) can be done by an ultra-short laser, with a pulse duration in the femtosecond or picosecond regime. The wavelength of the laser, which typically varies between 200 and 16000 nm, is to be chosen according to the characteristics of the desired texturing (30), such as the shape and the dimensions of the cavities (31), patterns, periodicity, etc.

The following references can be consulted to configure the laser system:

YU (2013), "Femtosecond laser nanomachining initiated by ultraviolet multiphoton ionization", Optics Express.

SEDAO (2012), "Large area laser surface micro/nanopatterning by contact microsphere lens arrays", Applied Physics A.

In FIGS. 3 to 6, different devices (2, 3, 4, 5) not according to the invention are represented. Excluding the differences detailed below, the substrate (10), the coating layer (20) and the texturing (30) have the same characteristics as for the device (1) described above.

In FIG. 2, the device (2) is constituted by a silicon Si substrate (10) and a DLC coating (20), both untextured.

Figure 4:
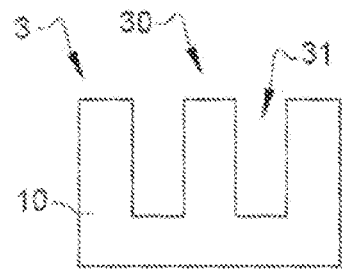
FIG. 4 is a cross-section similar to FIG. 1, showing a device constituted by an untextured Si substrate and a textured DLC coating.

In FIG. 4, the device (3) is constituted by a textured, but uncoated silicon Si substrate (10). The substrate (10) of the device (3) has the same thickness as the device (1). The cavities (31) have the same depth (P31) for the two devices (1, 3).

Figure 5:
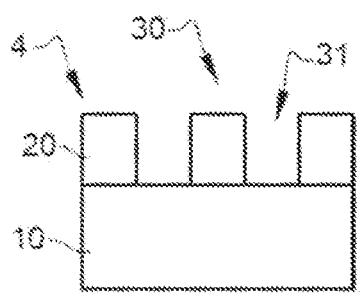
FIG. 5 is a cross-section similar to FIG. 1, showing a device constituted by an untextured and uncoated Si substrate.

In FIG. 5, the device (4) is constituted by an untextured silicon Si substrate (10) and a textured DLC coating (20). The cavities (31) extend through the coating (20), but do not penetrate into the substrate (10).

Figure 6:
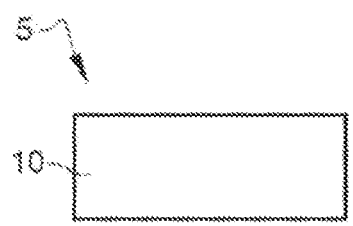
FIG. 6 is a schematic, top view representation, of the device of FIG. 1.

In FIG. 6, the device (5) is constituted by an untextured and uncoated Si substrate (10). The substrate (10) of the device (3) has the same thickness as the substrate (10) of the device (1).

Figure 7:
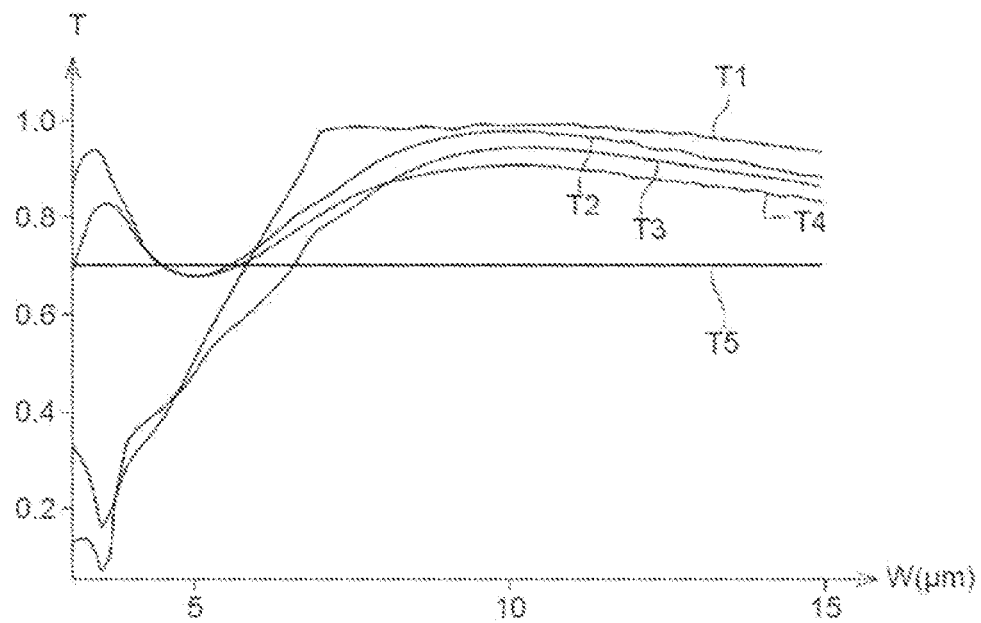
FIG. 7 is a graph showing the evolution of the transmission (T of 0 to 1) according to the wavelength (WL of 3 to 15 μm), for each of the devices of FIGS. 1 to 5.

In FIG. 7, the graph comprises five curves showing the evolution of the transmission (T1, T2, T3, T4, T5) according to the wavelength (WL), for the devices (1, 2, 3, 4, 5). On the x-axis, the wavelength (WL) varies from 3 to 15 µm. On the y-axis, the transmission (T) varies from 0 to 1.

The transmission curve (T1) corresponds to the device (1) according to the invention, shown in FIGS. 1 and 2.

Figure 3:
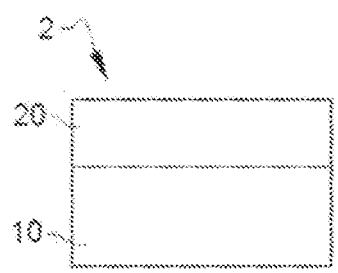
FIG. 3 is a cross-section similar to FIG. 1, showing a device constituted by a textured and uncoated Si substrate.

The transmission curve (T2) corresponds to the device (2) shown in FIG. 3.

The transmission curve (T3) corresponds to the device (3) shown in FIG. 4.

The transmission curve (T4) corresponds to the device (4) shown in FIG. 5.

The transmission curve (T5) corresponds to the device (5) shown in FIG. 6.

As shown on the graph in FIG. 7, the transmission (T1) of the device (1) is improved with respect to each of the devices (2, 3, 4, 5), at the spectral width and the maximum transmission (therefore, minimum absorption).

The transmissions (T1, T3) have an interruption around 3 to 5 µm, possibly linked to the depth of the cavities (31) penetrating into the substrate (10).

Figure 8:
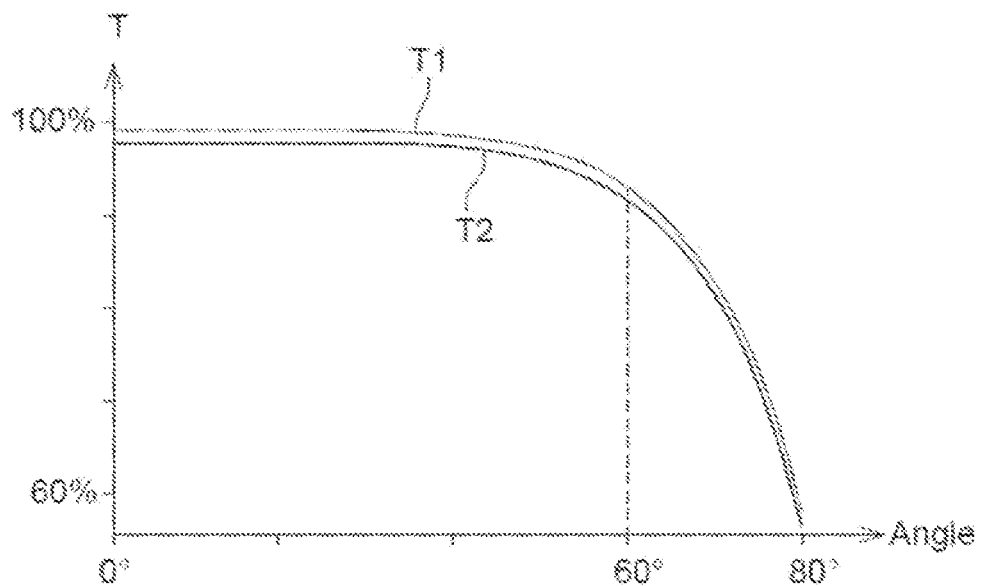
FIG. 8 is a graph showing the evolution of the transmission (T as a %) according to the angle of incidence (Angle of 0 to 80°) of the radiation on the surface of the device, for the devices of FIGS. 1 and 2.
Figure 9:
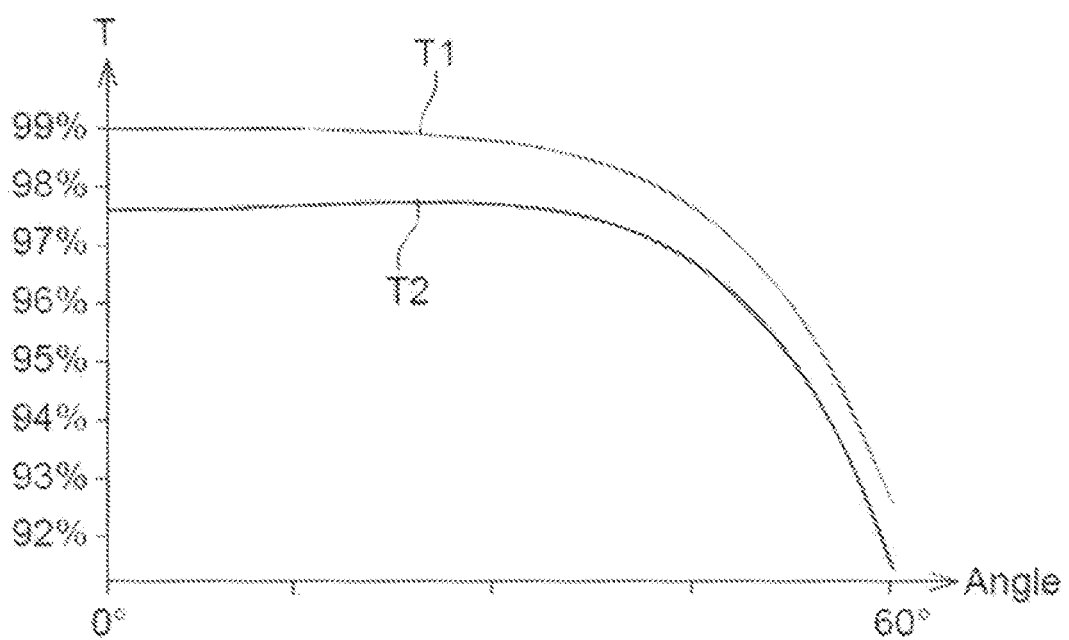
FIG. 9 is a graph similar to FIG. 8, showing the evolution of the transmission (T as a %) according to the angle of incidence (Angle of 0 to 60°) for the devices of FIGS. 1 and 2.

In FIGS. 8 and 9, the graphs comprise two curves showing the evolution of the transmission (T1, T2) according to the angle of incidence (Angle), for the devices (1, 2). It is noted that the angular transmission width is greater for the device (1) than for the device (2).

Figure 10:
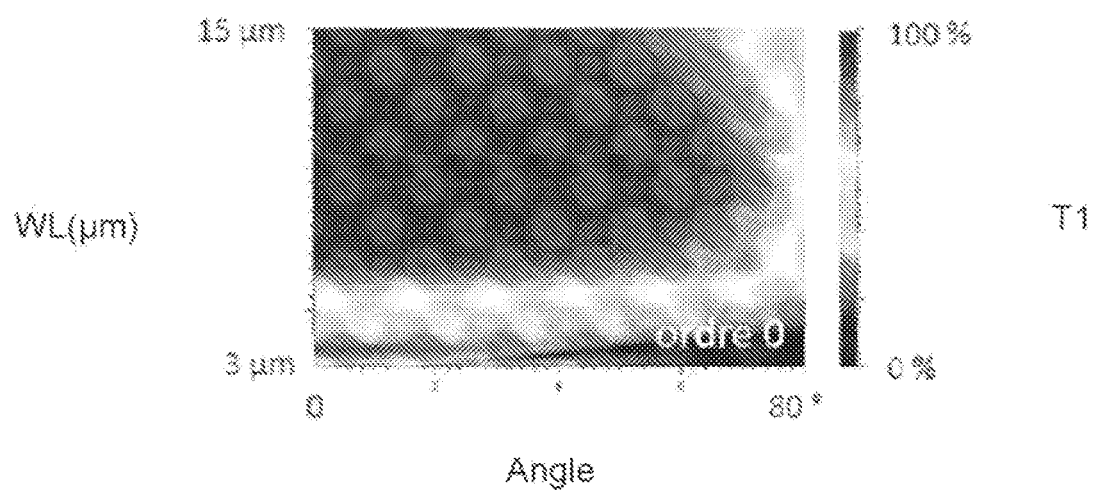
FIG. 10 is a diagram showing the evolution of the transmission (T as a %) according to the wavelength (WL of 3 to 15 μm) and of the angle of incidence (Angle of 0 to 80°), for the device of FIG. 1, according to the invention.
Figure 11:
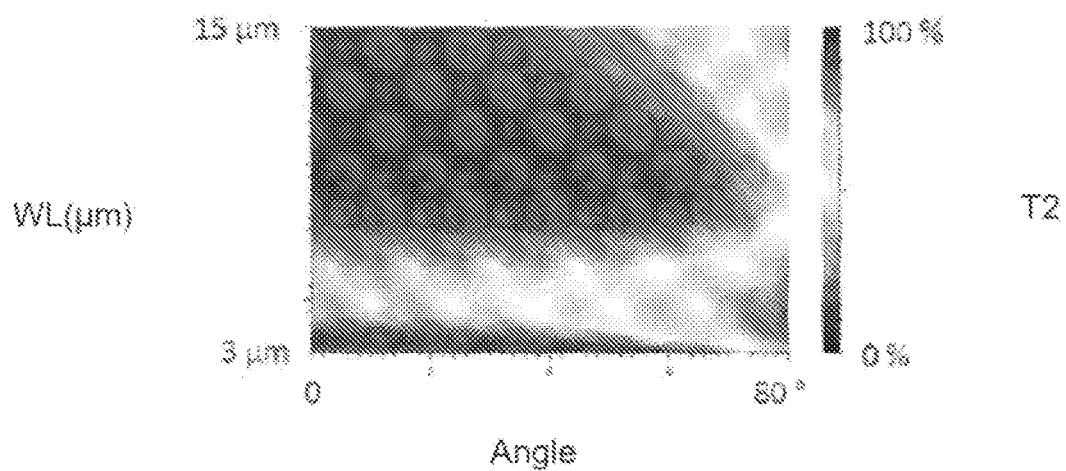
FIG. 11 is a diagram similar to FIG. 10, for the device of FIG. 2.

In FIGS. 10 and 11, the diagrams show the evolution of the transmission (T1, T2) according to the wavelength (WL) and of the angle of incidence (Angle)). The evolution of the transmission (T1, T2) is represented as 2D, by colour shades. It is noted that the transmission range is greater for the device (1) than for the device (2), except for the wavelengths (WL) around 3 to 5 µm.

The structure of the device (1) forms a two-layer system, comprising a textured coating layer (20) and a textured layer (11) of the substrate (10), surmounting the untextured part of the substrate (10).

Thanks to the texturing (30), the structure of the device (1) makes it possible to obtain anti-reflective performances, improved with respect to the devices (2, 3, 4, 5).

The anti-reflective performances of the device (1) are comparable to those of multilayer systems comprising several superposed coating layers (20). The performing of the texturing (30) is particularly advantageous, when the application of multilayer coatings is not possible, practical or desirable.

Figure 12:
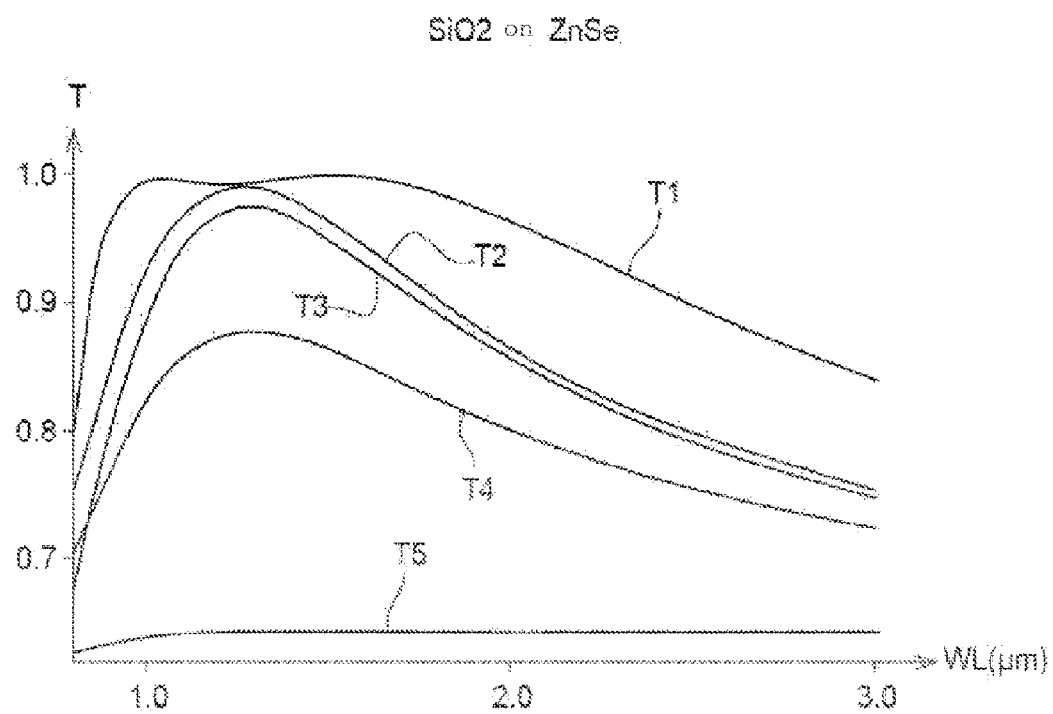
FIG. 12 is a graph similar to FIG. 7, showing the evolution of the transmission (T of 0.7 to 1) according to the wavelength (WL of 0.8 to 3 μpm), for five different devices, configured like in FIGS. 1 to 5, with a zinc selenide ZnSe substrate and for some, a silicon dioxide SiO2 coating layer.

In FIG. 12, a graph similar to FIG. 7 is represented, showing the evolution of the transmission (T1, T2, T3, T4, T5), for five devices (1, 2, 3, 4, 5) configured like in FIGS. 1 to 5, with a silicon dioxide SiO2 coating layer (20) deposited on a zinc selenide ZnSe substrate (10). On the x-axis, the wavelength (WL) varies from 0.8 to 3 μm, in the near and mid IR range. In the y-axis, the transmission (T) varies from 0.7 to 1.

For the devices (1, 2, 3, 4, 5), the zinc selenide ZnSe substrate (10) has a refraction index n=2.46.

For the devices (1, 2, 4), the silicon dioxide SiO2 coating layer (20) has a thickness (E20) of 230 nm and a refraction index n=1.44.

For the devices (1, 3, 4), the cavities (31) have a periodicity (L31) of 320 nm and a diameter (D31) of 265 nm.

For the devices (1, 4), the cavities (31) have a depth (P31) of around 400 nm.

The device (1) is well-suited to the transmission of electromagnetic radiation in a near and mid IR wavelength range, between 0.8 and 3 μm.

As shown on the graph in FIG. 12, the transmission (T1) of the device (1) is improved with respect to each of the devices (2, 3, 4, 5), at the spectral width and the maximum transmission (therefore minimum absorption).

Figure 13:
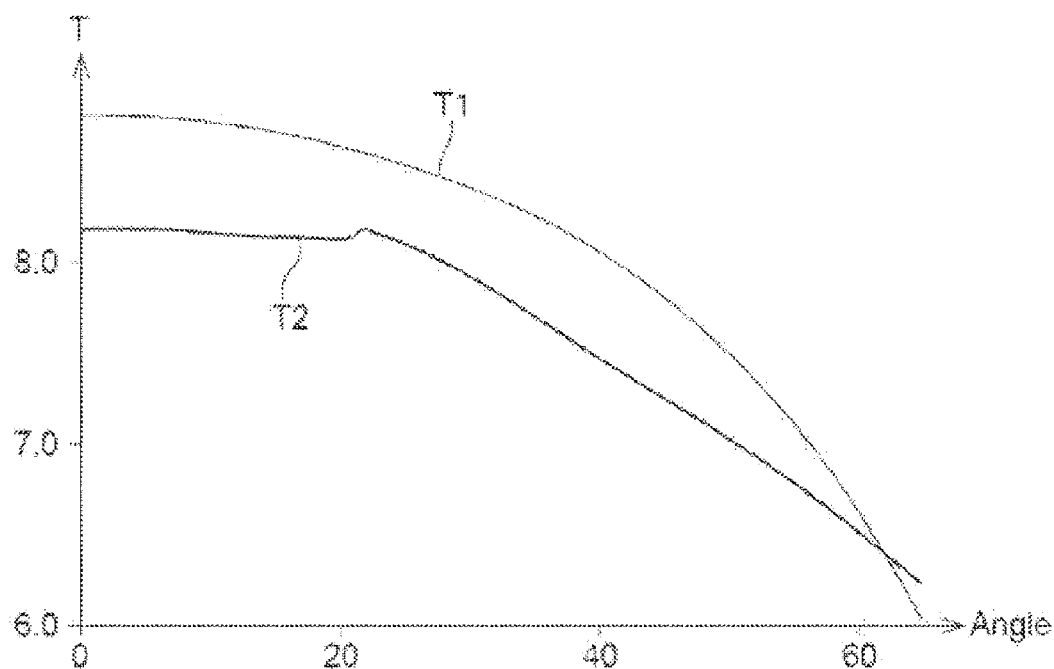
FIG. 13 is a graph similar to FIG. 9, for two devices the transmission of which is represented in FIG. 12, namely a device according to the invention comprising a textured substrate and a textured coating, and a device comprising an untextured substrate and untextured coating.

In FIG. 13, the graph comprises two curves showing the evolution of the transmission (T1, T2) according to the angle of incidence (Angle), for the devices (1, 2) described above in line with FIG. 12. It is noted that the angular transmission width is greater for the device (1) than for the device (2).

Figure 14:
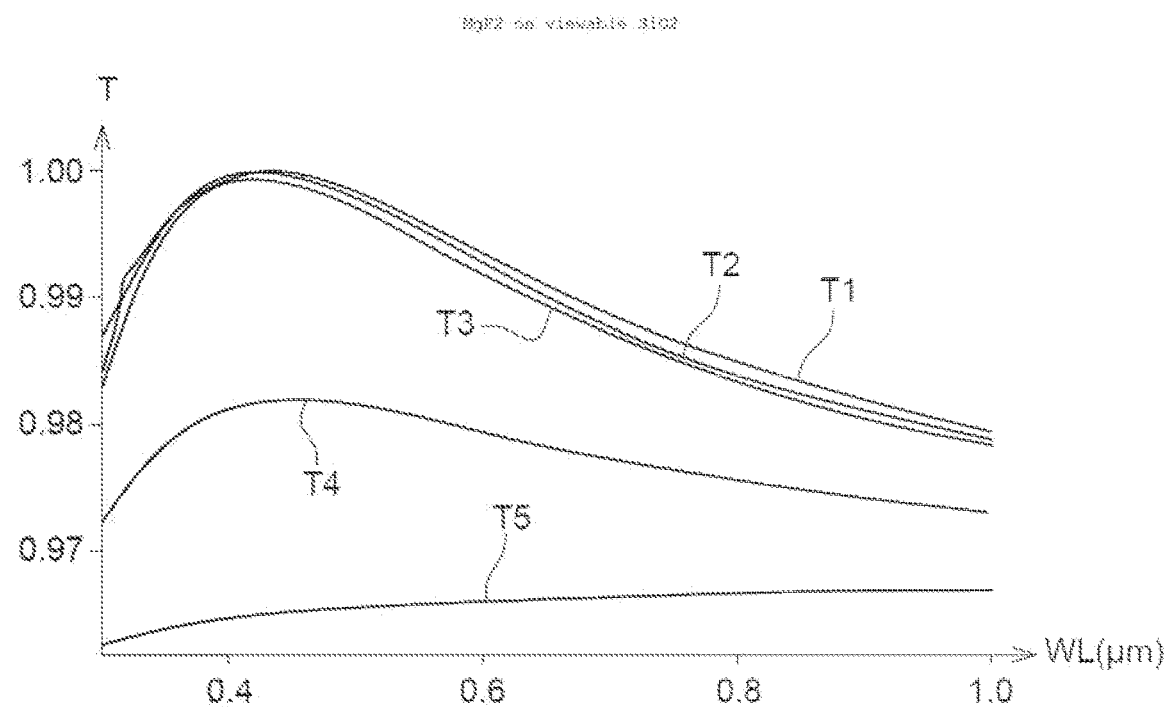
FIG. 14 is a graph similar to FIG. 7, showing the evolution of the transmission (T of 0.96 to 1) according to the wavelength (WL of 0.3 to 1 μm), for five different devices, configured like in FIGS. 1 to 5, with a silicon dioxide SiO2 substrate and for some, a magnesium fluoride MgF2 coating layer.

In FIG. 14, a graph similar to FIG. 7 is represented, showing the evolution of the transmission (T1, T2, T3, T4, T5), for five devices (1, 2, 3, 4, 5) configured like in FIGS. 1 to 5, with a magnesium fluoride MgF2 coating layer (20) deposited on a silicon dioxide SiO2 substrate (10). On the x-axis, the wavelength (WL) varies from 0.3 to 1 μm, in the visible, near and mid IR range. In the y-axis, the transmission (T) varies from 0.96 to 1.

For the devices (1, 2, 3, 4, 5), the silicon dioxide SiO2 substrate (10) has a refraction index n=1.44.

For the devices (1, 2, 4), the magnesium fluoride MgF2 coating layer (20) has a thickness (E20) of 57 nm and a refraction index n=1.38.

For the devices (1, 3, 4), the cavities (31) have a periodicity (L31) of 202 nm and a diameter (D31) of 160 nm.

For the devices (1, 4), the cavities (31) have a depth (P31) of around 94 nm.

The device (1) is well-suite to the transmission of electromagnetic radiation in a visible wavelength range, between 0.38 and 0.78 μm.

As shown on the graph in FIG. 14, the transmission (T1) of the device (1) is improved with respect to the transmissions (T2, T5) of the devices (2, 5), at the spectral width and the maximum transmission (therefore minimum absorption).

However, the transmission (T1) of the device (1) is relatively close to the transmissions (T3, T4) of the devices (3, 4).

Figure 15:
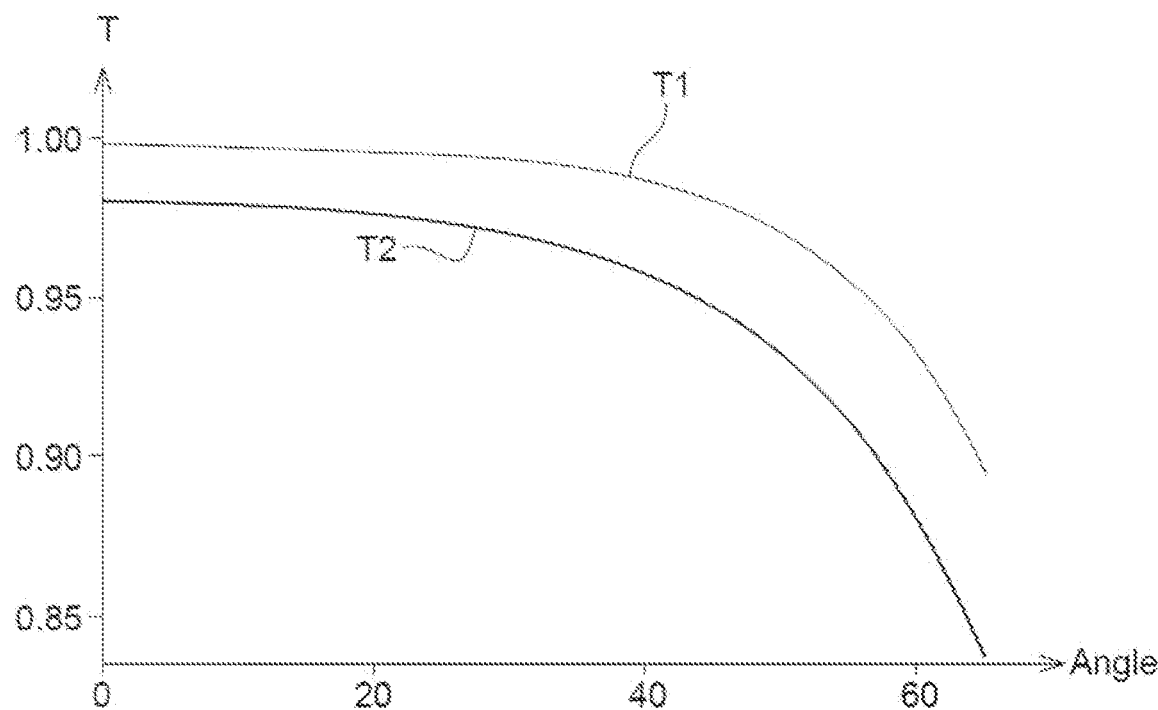
FIG. 15 is a graph similar to FIG. 9, for two devices the transmission of which is represented in FIG. 14, namely a device according to the invention comprising a textured substrate and a textured coating, and a device comprising an untextured substrate and an untextured coating.

In FIG. 15, the graph comprises two curves showing the evolution of the transmission (T1, T2) according to the angle of incidence (Angle), for the devices (1, 2) described above in line with FIG. 14. It is noted that the angular transmission width is greater for the device (1) than for the device (2).

In FIG. 16, a graph similar to FIG. 7 is represented, showing the evolution of the transmission (T1, T2, T3, T4, T5), for five devices (1, 2, 3, 4, 5) configured like in FIGS. 1 to 5, with a silicon dioxide SiO2 coating layer (20) deposited on an alumina Al2O3 substrate (10). On the x-axis, the wavelength (WL) varies from 0.3 to 1 μm, in the visible, near and mid IR range. On the y-axis, the transmission (T) varies from 0.96 to 1.

For the devices (1, 2, 3, 4, 5), the alumina Al2O3 substrate (10) has a refraction index n=1.69.

For the devices (1, 2, 4), the silicon dioxide SiO2 coating layer (20) has a thickness (E20) of 83 nm and a refraction index n=1.44.

For the devices (1, 3, 4), the cavities (31) have a periodicity (L31) of 176 nm and a diameter (D31) of 159 nm.

For the devices (1, 4), the cavities (31) have a depth (P31) of around 156 nm.

The device (1) is well-suited to the transmission of electromagnetic radiation in a visible, near and mid IR wavelength range, between 0.3 and 1 μm.

As shown on the graph in FIG. 16, the transmission (T1) of the device (1) is improved with respect to each of the devices (2, 3, 4, 5), at the spectral width and the maximum transmission (therefore minimum absorption), in particular for a near and mid IR wavelength range.

Other variants of a device (1) according to the invention are shown in FIGS. 17 to 37. Simply, the constitutive elements comparable to those of the first embodiment described above, have the same numerical references.

In FIG. 17, the cavities (31) are distributed on the surface of the device (1) with a variable periodicity. This variable periodicity evolves according to a defined rule and not randomly. The cavities (31) are separate and not in communication with one another. The variations are controlled, they are not due to an irregular surface state of the device (1) and/or to the imprecisions of the texturing method. The periodicity is different between the centre and the edges of the device (1). The cavities (31) are closer at the centre than at the edges.

Figure 18:
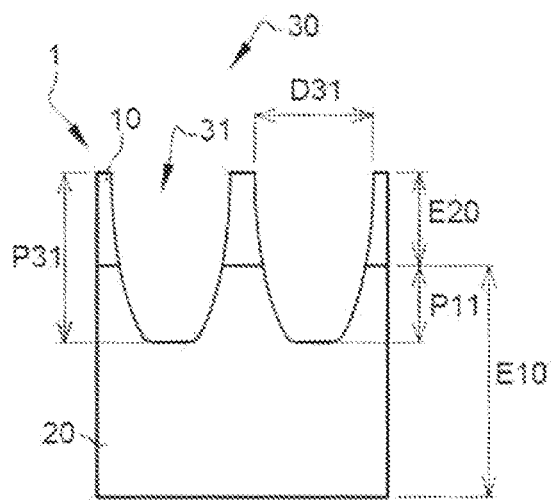
FIG. 18 is a cross-section similar to FIG. 2, showing a variant of the device according to the invention, the cavities having a symmetrical concave profile, with a cross-section, decreasing according to the depth, and not a cylindrical profile.

In FIG. 18, the cavities (31) have a symmetrical concave profile in an axial plane, with a diameter (D31) and an area cross-section, decreasing with the depth (P31).

Figure 19:
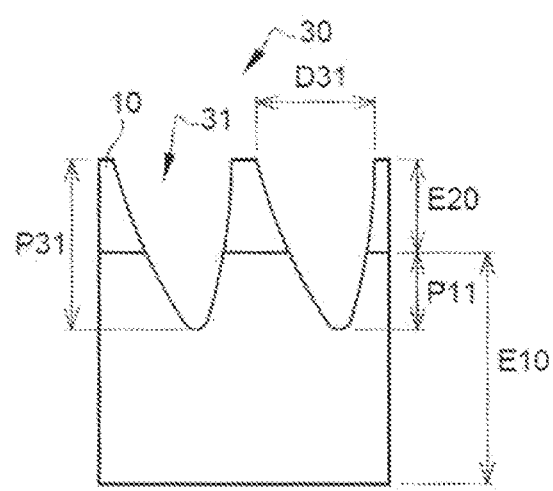
FIG. 19 is a cross-section similar to FIG. 2, showing a variant of the device according to the invention, the cavities having an asymmetrical concave profile.

In FIG. 19, the cavities (31) have an asymmetrical concave profile in an axial plane, with a greater dimension (D31) and an area cross-section, decreasing with the depth (P31). If the cross-section is circular, the greatest dimension (D31) is a diameter, otherwise for a non-circular cross-section, the greatest dimension (D31) is a length. In practice, the texturing (30) produces different optical effects according to the orientation of the incident radiation. This phenomenon is reinforced by the asymmetry of the cavities (31).

Figure 20:
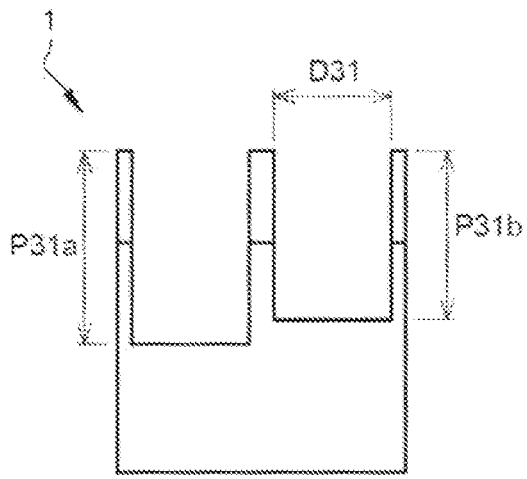
FIG. 20 is a cross-section similar to FIG. 2, showing a variant of the device according to the invention, the cavities having variable depths.

In FIG. 20, the cavities (31) have different depths (P31a, P31b).

Figure 21:
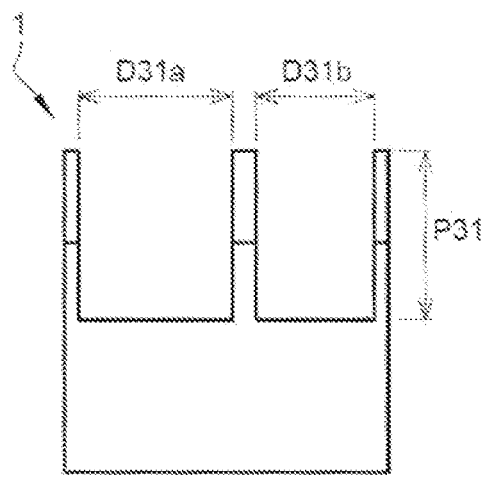
FIG. 21 is a cross-section similar to FIG. 2, showing a variant of the device according to the invention, the cavities having variable diameters.

In FIG. 21, the cavities (31) have different diameters (D31a, D31b).

Figure 22:
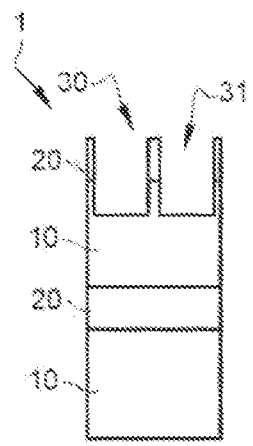
FIG. 22 is a cross-section similar to FIG. 2, showing a variant of the device according to the invention, comprising a stack of two substrates and two coating layers alternately, the cavities being formed only in the first coating layer and the first substrate.

In FIG. 22, the device (1) comprises a stack of two substrates (10) and two coating layers (20) alternately. The cavities (31) are formed only in the first combination (10+20) of a substrate (10) and a coating layer (20), oriented on the upper side, receiving the incident radiation. In the case of a multilayer, anti-reflective broadband device (1), this solution makes it possible to improve the correction of the wavefront, in comparison with an untextured multilayer device. Also, this solution represents a time saving with respect to a multilayer device, all the layers (20, 30) of which are extended through by the cavities (31), as described below.

Figure 23:
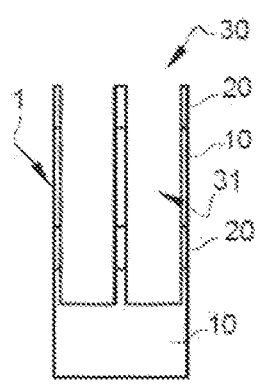
FIG. 23 is a cross-section similar to FIG. 2, showing a variant of the device according to the invention, comprising a stack of two substrates and two coating layers alternately, the cavities extending fully through the stack, except for the last substrate, which is partially sunk into.

In FIG. 23, the device (1) also comprises a stack of two substrates (10) and two coating layers (20) alternately. The cavities (31) extend fully through the stack, except for the last substrate (10), which is partially sunk into.

Figure 24:
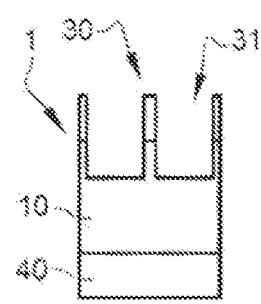
FIG. 24 is a cross-section similar to FIG. 2, showing a variant of the device according to the invention, comprising a rear layer made of a material different from the substrate and from the coating.

In FIG. 24, the device (1) comprises a rear layer (40) made of a material different from the substrate (10) and from the coating layer (20). The coating (20) is formed on a first side of the substrate (10), while the rear layer (40) is formed on a second side of the substrate (10) opposite the first side. The rear layer (40) has a function, different from the coating layer (20). For example, in the case of an anti-reflective device (1), this rear layer (40) can ensure anti-reflective and mechanical functions on the rear face, while the coating layer (20) has a broadband, anti-reflective function. According to another example, in the case of a mirror device (1), this rear layer (40) can be designed to reflect some of the radiation.

Figure 25:
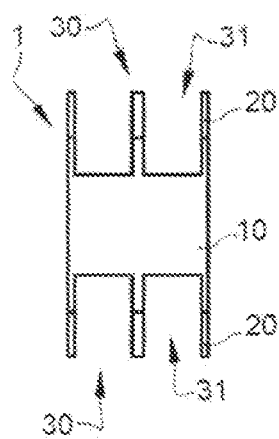
FIG. 25 is a cross-section similar to FIG. 2, showing a variant of the device according to the invention, with two faces, each comprising a substrate, a coating layer and surface texturing forming cavities extending through the coating layer and partially penetrating the substrate.

In FIG. 25, the device (1) comprises two faces configured according to the invention, with a central substrate (10). Each face comprises a coating layer (20) and texturing (30), forming cavities (31) which extend through the coating layer (20) and partially penetrate the substrate (10). The two coating layers (20) can be identical or different (materials, thicknesses, etc).

Figure 28:
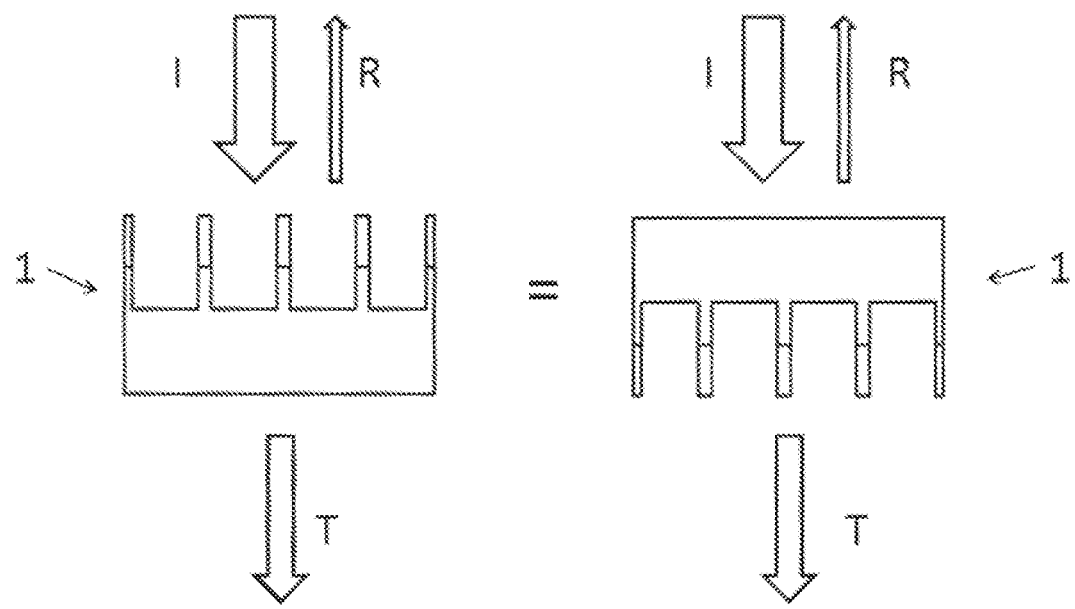
FIG. 28 is a scheme illustrating the reversibility of the device.

As illustrated in FIG. 28, in the case where there is no diffraction order, the behaviour of a surface of the device (1) does not depend on the direction of the optical path. Namely, the passage direction of the light from the air to the device (1) or from the device (1) to the air does not change the reflection and transmission rates of the device (1). FIG. 28 schematically shows that under these conditions, whatever the direction of the device (1), thus for incident optical radiation (I), the optical radiation reflected (R) and transmitted (T) are the same.

Figure 29:
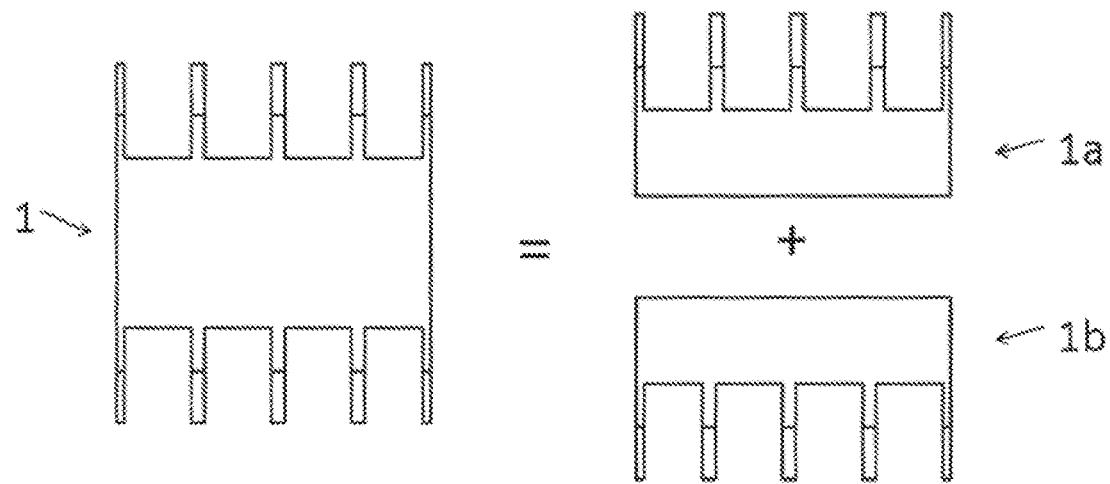
FIG. 29 is a scheme illustrating the optical equivalence of a complex device and of two simple devices.

In addition, as illustrated in FIG. 29, if the coherence length of the light does not exceed the thickness of the device (1), thus the device (1) illustrated in FIG. 25 can be considered as the assembly of two independent simple devices (1a, 1b), that they would have been juxtaposed. The transmission rate of the device (1) illustrated is thus the multiplication of the transmission rates of these two independent simple devices.

This configuration makes it possible to increase the performance of the device (1), since the optical system is thus equipped with a double wavefront correction device. This solution is advantageous for improving the correction of the wavefront, as it makes it possible to use the two faces of one same device (1) to correctly correct the wavefront twice, instead of adding a second device in addition to the first one. The overall bulk remains moderate.

Figure 26:
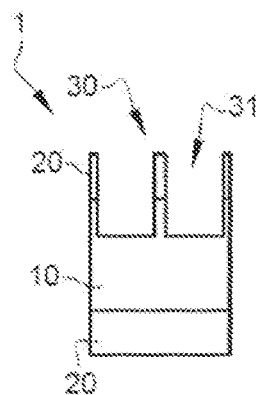
FIG. 26 is a cross-section similar to FIG. 2, showing a variant of the device according to the invention, with a first face comprising a coating layer and surface texturing forming cavities extending through the coating layer and partially penetrating the substrate, and a second face comprising a coating layer with no texturing, or receiving a treatment different from the texturing of the first face.

In FIG. 26, the device (1) comprises a first face configured according to the invention, with a coating layer (20) and texturing (30) partially penetrating into the substrate (10), and a second face with a coating layer (20), which has no texturing, or has no treatment, or receives a treatment different from the texturing of the first face. According to the explanations given above, in reference to FIGS. 25, 28 and 29, this configuration makes it possible to have the equivalent of two additional devices (1). The second face being suitable in terms of treatment or texturing, this solution makes it possible to choose the effect(s) that is/are sought to be had, for one or more wavelength range(s). In a first example, different treatments can be applied in one same wavelength range, for example a V-shaped anti-reflective treatment and a broadband anti-reflective treatment. According to a second example, different treatments can be applied in different wavelength ranges. According to a third example, one same treatment can be applied in two separate, juxtaposed or overlapping wavelength ranges. If the two wavelength ranges treated by each of the faces are juxtaposed or overlapping, the device (1) can be used to treat a wider range than with a single-face device. Alternatively, if the two wavelength ranges treated by each of the faces are separate, the device (1) can ensure the role of a filter. According to a particular application, it is possible to have a first wavefront correction treatment for a first wavelength range associated with a first detector, and a second wavefront correction treatment for a second wavelength range associated with a second detector.

Figure 27:
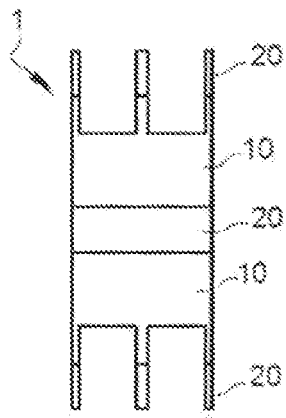
FIG. 27 is a cross-section similar to FIG. 2, showing a variant of the device according to the invention, with two faces, each comprising a substrate, a coating layer and texturing, and an intermediate layer formed between the two substrates.

In FIG. 27, the device (1) comprises two faces configured according to the invention, with a central layer (20/40). Each face comprises a coating layer (20) and texturing (30), forming cavities (31) which extend through the coating layer (20) and partially penetrate the substrate (10). The substrates (10) and coating layers (20) of the two faces can be identical or different (materials, thicknesses, etc.).

Figure 30:
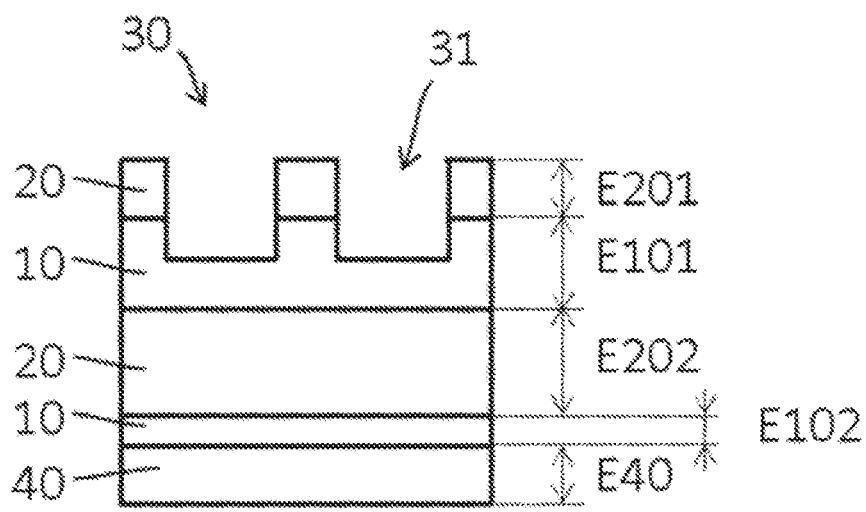
FIG. 30 is a cross-section similar to FIG. 2, showing a variant of the device according to the invention, comprising a stack of two substrates and two coating layers alternately, as well as a rear layer, the cavities being formed only in the first coating layer and the first substrate.

In FIG. 30, the device (1) comprises two stacks of substrate (10) and coating (20), as well as a rear layer (40). The cavities (31) are formed only in the first combination (10+20) of a substrate (10) and a coating layer (20), oriented on the upper side, receiving the incident radiation. From such a configuration, several tests have been carried out.

The first test relates to wavelengths of the visible field, of between 350 nm and 750 nm. The device (1) is configured as follows:
  the substrate (10) is made of HfO2, the coating (20) is made of SiO2, and the rear layer (40) is made of amorphous carbon;
  the first coating thickness (E201) measures 98 nm;
  the first substrate thickness (E101) measures 409 nm;
  the second coating thickness (E202) measures 174 nm;
  the second substrate thickness (E102) measures 73 nm;
  the thickness of the rear layer (40) is not imposed;
  the cavities (31) of the texturing (30) have a depth of 377 nm, thus extending through the first coating layer (20) and partially sinking into the first substrate layer (10). They are circular with a diameter of 138 nm, and distributed regularly along a square matrix with steps of 174 nm.

Figure 31:
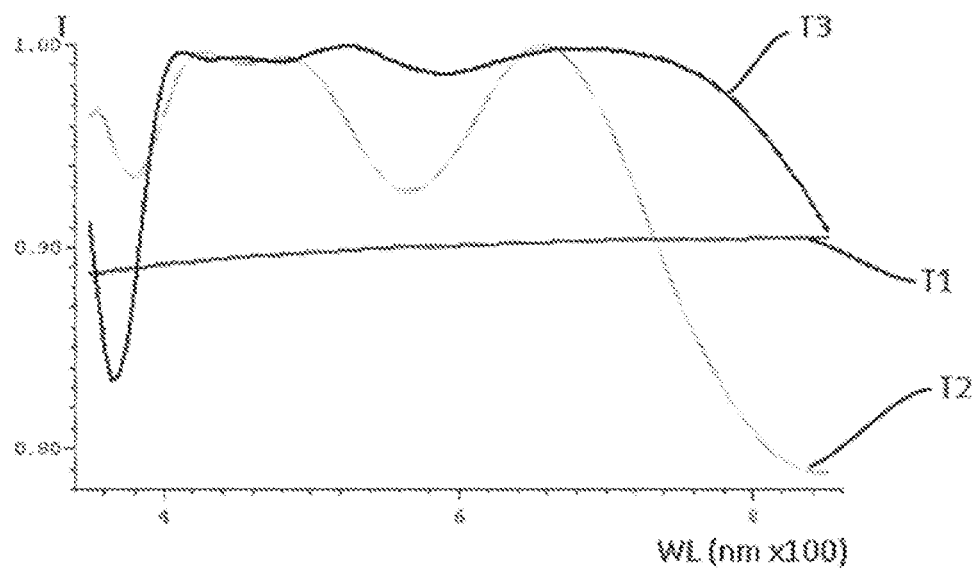
FIG. 31 is a graph similar to FIG. 7, showing the evolution of the transmission (T) according to the wavelength (WL of 340 to 840 nm), for three different devices, two devices of which with a stack of two HfO2 substrate layers, two SiO2 coating layers and an amorphous carbon rear layer.

FIG. 31 shows the transmission curve (T3) of this device (1), compared:
  with the transmission curve (T2) of a device comprising the same stacks of substrate (10) and of coating (20) and of rear layer (40), but without texturing (30);
  with a transmission curve (T1) of a device only comprising an amorphous carbon layer.

It can clearly be seen that the device (1) according to the configuration above makes it possible to obtain a transmission that is improved with respect to the two other configurations, and over a lot greater wavelength range.

The second test relates to wavelengths of the near infrared field, of between 1 and 2 μm. The device (1) is configured as follows:
  the substrate (10) is made of Si3N4, the coating (20) is made of SiO2, and the rear layer (40) is made of ZnSe;
  the first coating thickness (E201) measures 228 nm;
  the first substrate thickness (E101) measures 452 nm;

the second coating thickness (E202) measures 461 nm;
the second substrate thickness (E102) measures 166 nm;
the thickness of the rear layer (40) is not imposed;
the cavities (31) of the texturing (30) have a depth of 351 nm, thus extending through the first coating layer (20) and partially sinking into the first substrate layer (10). The cavities (31) are circular with a diameter of 255 nm, and distributed regularly along a square matrix with steps of 320 nm.

Figure 32:
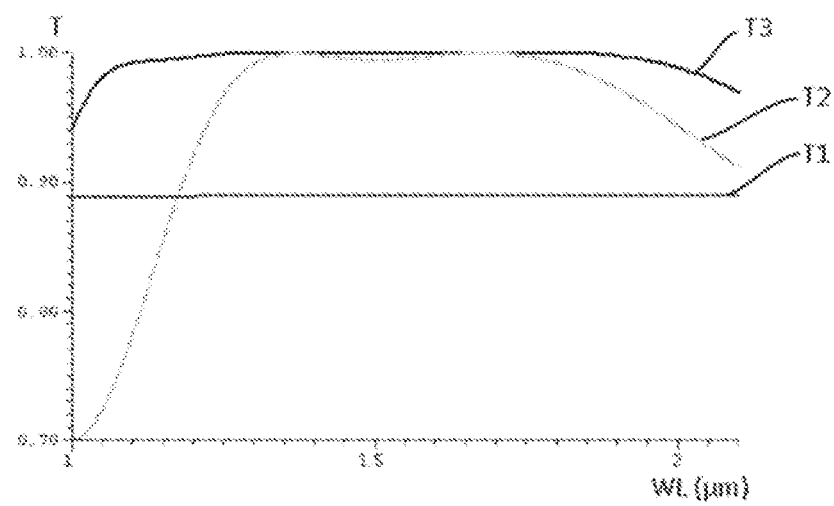
FIG. 32 is a graph similar to FIG. 7, showing the evolution of the transmission (T) according to the wavelength (WL of 1 to 2.4 µm), for three different devices, namely a device constituted of one single amorphous carbon layer, and two devices with a stack of two Si3N4 substrate layers, two SiO2 coating layers and a ZnSe rear layer, including one textured device and one untextured device.
Figure 33:
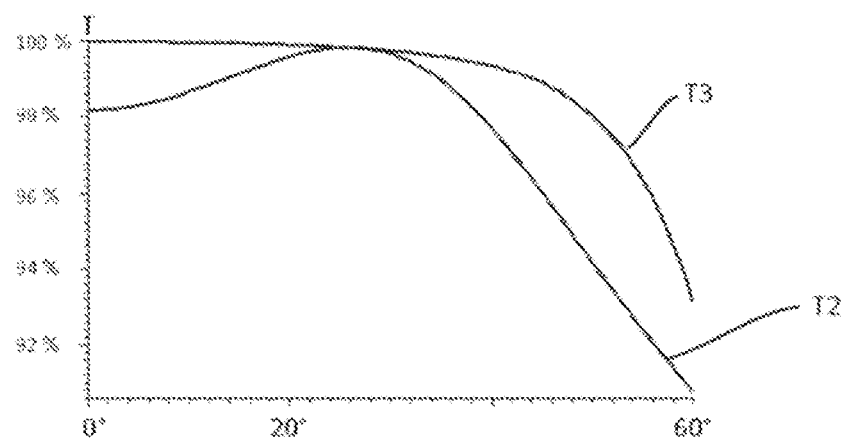
FIG. 33 is a graph similar to FIG. 9, for the multilayer devices, the transmission of which is represented in FIG. 32.

FIGS. 32 and 33 show the transmission curve (T3) of this device (1), compared:
with the transmission curve (T2) of a device comprising the same stacks of substrate (10) and of coating (20) and of rear layer (40), but without texturing (30);
with the transmission curve (T1) of a device only comprising an amorphous carbon layer (only in FIG. 32).

It can clearly be seen in FIG. 32, that the device (1) according to the configuration above makes it possible to obtain a transmission that is improved with respect to the two other configurations, and over a lot greater wavelength range.

It is seen in FIG. 33, that according to the angle of incidence of the optical radiation on the device (1), the transmission (T3) of the device (1) is improved with respect to the transmission (T2).

The third test relates to wavelengths of the mid infrared field, of between 7 and 15 μm. The device (1) is configured as follows:
the substrate (10) is made of TiO2, the coating (20) is made of DLC, and the rear layer (40) is made of Si;
the first coating thickness (E201) measures 1393 nm;
the first substrate thickness (E101) measures 541 nm;
the second coating thickness (E202) measures 2843 nm;
the second substrate thickness (E102) measures 838 nm;
the thickness of the rear layer (40) is not imposed;
the cavities (31) of the texturing (30) have a depth of 1934 nm, thus extending through the first coating layer (20) and partially sinking into the first substrate layer (10). The cavities (31) are circular with a diameter of 1600 nm, and distributed regularly along a square matrix with steps of 2000 nm.

Figure 34:
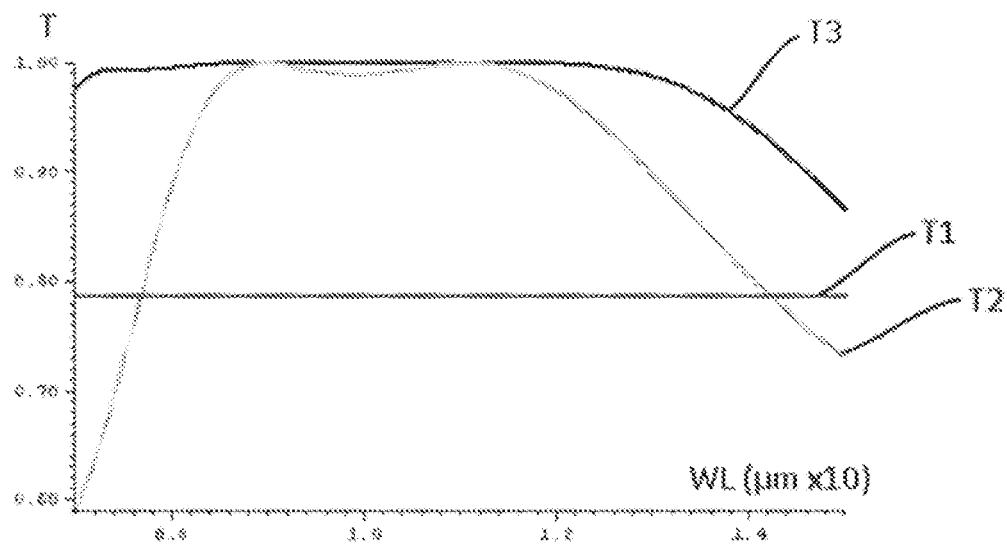
FIG. 34 is a graph similar to FIG. 7, showing the evolution of the transmission (T) according to the wavelength (WL of 7 to 15 µm), for three different devices, namely a device constituted of one single amorphous carbon layer, and two devices with a stack of two TiO2 substrate layers of two DLC coating layers, and one Si rear layer, including one textured device and one untextured device.
Figure 35:
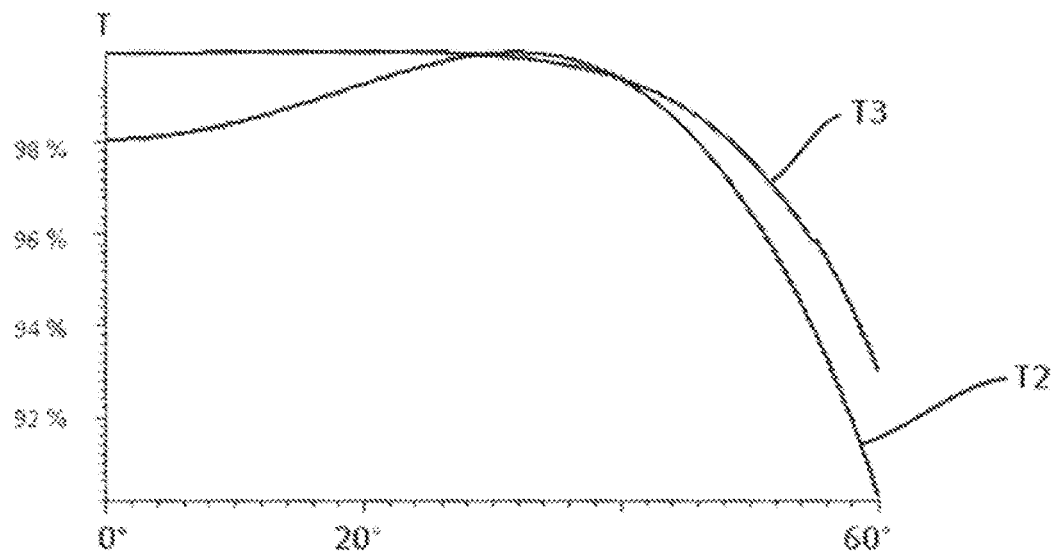
FIG. 35 is a graph similar to FIG. 9, for the two multilayer devices, the transmission of which is represented in FIG. 34.

FIGS. 34 and 35 show the transmission curve (T3) of this device (1), compared:
with the transmission curve (T2) of a device comprising the same stacks of substrate (10) and of coating (20) and of rear layer (40), but without texturing (30);
with the transmission curve (T1) of a device only comprising an amorphous carbon layer (only in FIG. 34).

It can clearly be seen in FIG. 34 that the device (1) according to the configuration above, makes it possible to obtain a transmission that is improved with respect to the two other configurations, and over a lot greater wavelength range.

It is seen in FIG. 35 that according to the angle of incidence of the optical radiation on the device (1), the transmission (T3) of the device (1) is improved with respect to the transmission (T2).

The fourth test also relates to wavelengths of the mid infrared field, of between 7 and 15 μm. The device (1) is configured as follows:
the substrate (10) is made of TiO2, the coating (20) is made of DLC, and the rear layer (40) is made of Si;
the first coating thickness (E201) measures 1054 nm;
the first substrate thickness (E101) measures 2160 nm;
the second coating thickness (E202) measures 142 nm;
the second substrate thickness (E102) measures 1293 nm;
the thickness of the rear layer (40) is not imposed;
the cavities (31) of the texturing (30) have a depth of 1968 nm, thus extending through the first coating layer (20) and partially sinking into the first substrate layer (10). The cavities (31) are circular with a diameter of 1600 nm, and distributed regularly along a square matrix with steps of 2000 nm.

Figure 36:
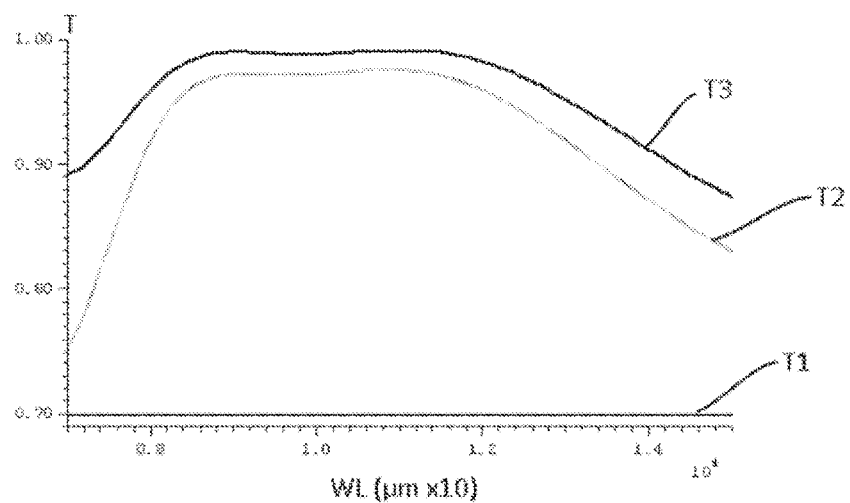
FIG. 36 is a graph similar to FIG. 7, showing the evolution of the transmission (T) according to the wavelength (WL of 7 to 15 µm), for three different devices, namely a device constituted of one single amorphous carbon layer, and two devices with a stack of two TiO2 substrate layers, two DLC coating layers, and one Si rear layer, including one textured device and one untextured device.
Figure 37:
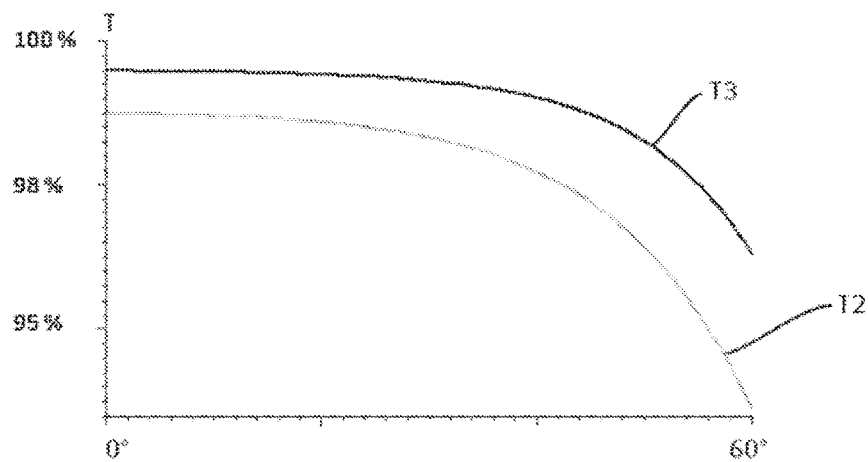
FIG. 37 is a graph similar to FIG. 9, for the two multilayer devices, the transmission of which is represented in FIG. 36.

FIGS. 36 and 37 show the transmission curve (T3) of this device (1), compared:
with the transmission curve (T2) of a device comprising the same stacks of substrate (10) and of coating (20) and of rear layer (40), but without texturing (30);
with the transmission curve (T1) of a device only comprising an amorphous carbon layer (only in FIG. 36).

It can clearly be seen in FIG. 36 that the device (1) according to the configuration above makes it possible to obtain a transmission that is improved with respect to the two other configurations, and over a lot greater wavelength range.

It is seen in FIG. 37 that according to the angle of incidence of the optical radiation on the device (1), the transmission (T3) of the device (1) is improved with respect to the transmission (T2).

Moreover, the device (1) can be shaped differently from FIGS. 1 to 37 without moving away from the scope of the invention, which is defined by the claims. Furthermore, the technical characteristics of the different embodiments and variants mentioned above can be, totally or for some of them, combined together. Thus, the device (1) can be suitable in terms of cost, functionalities and performance.

What is claimed is:

1. An optical device, suitable for transmitting/reflecting electromagnetic radiation in a wavelength range of an electromagnetic spectrum, said device comprising:
a substrate made of a first material chosen from the following materials:
silicon Si, germanium Ge, zinc sulphide ZnS, zinc selenide ZnSe,
a coating layer formed on a first side of the substrate and made of a second material, different from the first material, this second material being chosen from the following materials: silicon Si, germanium Ge, zinc sulphide ZnS, zinc selenide ZnSe, tantalum pentoxide Ta2O5, hafnium dioxide HfO2, alumina Al2O3,
at least a rear layer formed on a second side of the substrate opposed to the first side and having an optical function different from the coating layer, said rear layer being made of a material different from the substrate and from the coating layer, and
a surface having a plurality of cavities formed by surface texturing in a pattern forming a varying effective refraction index,
wherein the plurality of cavities are extending through the coating layer and are partially sunk into the substrate,
wherein the optical device is suitable for transmitting/reflecting electromagnetic radiation in a wavelength range of the electromagnetic spectrum corresponding to an infrared radiation,
wherein the material of the rear layer is a member of a group consisting of: silicon Si, germanium Ge, zinc sulphide ZnS, and zinc selenide ZnSe.

2. The device according to claim 1, wherein the cavities have a continuous profile between the coating layer and the substrate.

3. The device according to claim 1, wherein the cavities have a circular cross-section.

4. The device according to claim 1, wherein the cavities have a concave profile in an axial plane, with an area cross-section, decreasing according to a depth.

5. The device according to claim 1, wherein the cavities have a symmetrical concave profile in an axial plane.

6. The device according to claim 1, wherein the cavities have an asymmetrical concave profile in an axial plane.

7. The device according to claim 1, wherein the cavities are distributed according to a regular array over a surface of the device.

8. The device according to claim 1, wherein the cavities are distributed over a surface of the device with a variable periodicity, evolving according to a defined rule and not randomly.

9. The device according to claim 1, wherein it comprises a stack of several substrates and coating layers alternately, including at least one first combination (10+20) of a first coating layer and a first substrate, and a last combination (10+20) of a last coating layer and a last substrate.

10. The device according to claim 9, wherein the cavities are formed only in the first combination (10+20).

11. The device according to claim 9, wherein the cavities extend fully through the stack, except for the last substrate, which is partially sunk into, and in that the cavities have an area cross-section strictly decreasing in a direction of the last substrate.

12. The device according to claim 9, wherein the stack comprises at least one intermediate combination (10+20) between the first combination (10+20) and the last combination (10+20).

13. The device according to claim 1, wherein it comprises two faces, each with a coating layer and the plurality of cavities are extending through the coating layer and partially penetrating the substrate or one of the substrates.

14. The device according to claim 1, wherein it comprises a first face with a coating layer and the plurality of cavities extending through the coating layer and partially penetrating the substrate or one of the substrates, and a second face with a coating layer which has no texturing or has no treatment, or receives a treatment that is different from the texturing of the first face.

15. A method for manufacturing an optical device, suitable for transmitting/reflecting electromagnetic radiation in a wavelength range of an electromagnetic spectrum corresponding to an infrared radiation, said method comprising:
    forming at least one combination of:
    a substrate made of a first material selected from a group consisting of: silicon Si, germanium Ge, zinc sulphide ZnS, and zinc selenide ZnSe, and
    a coating layer formed on a first side of the substrate and made of a second material that is different from the first material and selected from a group consisting of: silicon Si, germanium Ge, zinc sulphide ZnS, zinc selenide ZnSe, tantalum pentoxide Ta2O5, hafnium dioxide HfO2, alumina Al2O3, and
    a rear layer formed on a second side of the substrate opposed to the first side and having an optical function different from the coating layer and made of a material different from the substrate and from the coating layer and selected from a group consisting of: Silicon Si, germanium Ge, zinc sulphide ZnS, zinc selenide ZnSe;
    performing a surface texturing forming a plurality of cavities in a surface of the device, making the varying effective refraction index vary over the surface of the device, wherein the cavities extend through the coating layer and are partially sunk into the substrate.

* * * * *